United States Patent Office 2,884,424
Patented Apr. 28, 1959

2,884,424
PRODUCTION OF TRIAZOLES AND AMIDRAZONES OF THE ANTHRAQUINONE SERIES

Erwin Klingsberg, Mountainside, N.J., assignor to American Cyanamid Company, New York, N.Y., a corporation of Maine No Drawing. Application November 18, 1957
Serial No. 696,941

9 Claims. (Cl. 260—308)

This invention relates to a new process of preparing amidrazones and triazoles of the anthraquinone series which are useful for the production of vat dyes. More particularly, it relates to the reaction of an aromatic carbohydrazide with an aromatic chloroimide, at least one of which belongs to the anthraquinone series. This reaction may be represented by the following equation:

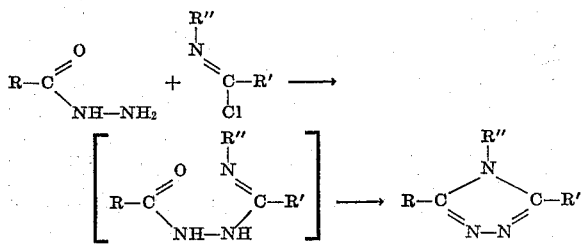

wherein R, R' and R'' are aromatic radicals, at least one of which belong to the anthraquinone series. The R, R' and R'' radicals may be further substituted by halogeno, amino, nitro, alkoxy, alkyl, and the like.

In some instances this reaction stops at the amidrazone stage and in some instances, it goes spontaneously to the triazole. In the former case, the ring closure can be induced by heating with a reagent such as $SOCl_2$ or chlorsulfonic acid. The final products are useful intermediates for vat dyes.

Although some anthraquinonecarbohydrazides have been described in the literature, the methods reported are not always successful. Only the preparation of the 1-substituted derivatives of this compound have been described in the prior art, namely the 1amino or 1-nitro. Preparation of the unsubstituted parent compound is not satisfactory using the prior art method. The reaction of 2-anthraquinonecarbonyl chloride with a large excess of hydrazine gives, instead of the expected anthraquinonecarbohydrazide, an intractable mixture analyzing very low in nitrogen. Moreover, the 2-anthraquinonecarboxylic ester does not react under normal conditions with hydrazine, but is recovered unchanged.

I have found that anthraquinone-2-carboxylic esters can be reacted with hydrazine if they are first reduced to the leuco form and this forms one part of my invention. The leuco form reacts with hydrazine to give yields of the hydrazide which are near theory. This preparation is usable to advantage, even with the substituted anthraquinone acids which can react directly with hydrazine. It is an advantage of this part of my invention that the reduction to the leuco form may be accomplished by the use of hydrazine itself. The hydrazine, therefore, affects both vatting and hydrazinolysis. The reaction begins at temperatures as low as room temperature, but is faster with heating and is conveniently carried out at reflux. At least 1.5 moles of hydrazine should be used, but larger quantities may conveniently be used. The leuco hydrazide thus formed may be oxidized by air to the anthraquinonecarbohydrazide which is a starting material in the principal process of this invention.

Some other 2-anthraquinonecarbohydrazides such as the 1-nitro, 8-nitro, 1-chloro, 1-amino-derivatives, which are likewise starting materials for the reaction of this invention, can on the other hand be prepared by the known reaction of the corresponding acid chlorides with hydrazine. All these hydrazides are usable in the process which forms another part of my invention.

I have found further that a carbohydrazide and a chlorimide, at least one of which has an anthraquinonyl radical, react in high boiling organic solvents at temperatures above about 120° C. to form condensation products which are 1,2,4-triazoles or amidrazone intermediates which are convertible into such triazoles. Such anthraquinonyl-1,2,4-triazoles are vat dyes or intermediates for the preparation of vat dyes.

It is not necessary to use carbohydrazides of the anthraquinone series as starting materials for this new process, since the anthraquinonyl radical can be in the chlorimide. One can use various non-anthraquinone, aromatic carbohydrazides as long as the chloroimide reactant is of the anthraquinone series. Thus, the carbohydrazides which can be used include those derived from various aromatic acids, as, e.g., benzoic acid, o- or p-toluic acid, methoxy benzoic acids, ethoxybenzoic acids, chlorobenzoic acid, bromobenzoic acids, napthoic acids, benzoylamino benzoic and naphthoic acids, pyridine carboxylic acids such as nicotinic acid, thenoic acid, anthraquinone-2-carboxylic acid, or 1-chloroanthraquinone-2-carboxylic acid.

The other reactants in this new process, the chloroimides, are made by the known reactions of a monosubstituted amide with $PCl_5$ or thionyl chloride. The chloroimides which can be used include those derived from various N-substituted aromatic amides such as benzanilide, benzanisidide, benzotolidide, benzoxylidide, benzoyl 1- or 2-naphthylamides, benzoyl-4-diphenyl amide, benzoylnicotinamide, benzoyl-2-anthraquinonyl amide, substituted benzanilides such as methoxybenzanilides, toluanilides, dimethoxybenzanilides and the like; pyridine carboxanilides, anthraquinoyl-2-carboxanilides of these amines, and the like.

The process of my invention requires that at least one of the hydrazide or the chloroimide be derived from an anthraquinone. Thus, there must be used an anthraquinone-2-carbohydrazide and/or a 2-anthraquinonecarboximidyl chloride. The anthraquinonyl group may be substituted in the 1, 3, 4, 5, 6, 7, or 8 position by chloro, bromo, nitro, amino benzoylamino, and the like.

It is an advantage of my invention that the process permits the preparation of unsymmetrical 1,2,4-triazoles having anthraquinone groups at various positions. It is a further advantage of my invention that the products can be used to prepare vat dyes of various shades from yellows to reds and blues. Some are themselves vat dyes.

The process of this invention, which is the reaction between a chloroimide and a carbohydrazide, at least one of which belongs to the anthraquinone series, is advantageously conducted in an inert high boiling solvent such as ortho-dichlorobenzene, nitrobenzene, and the like. In most cases, the end product is obtained directly by spontaneous cyclodehydration under the conditions of the reaction:

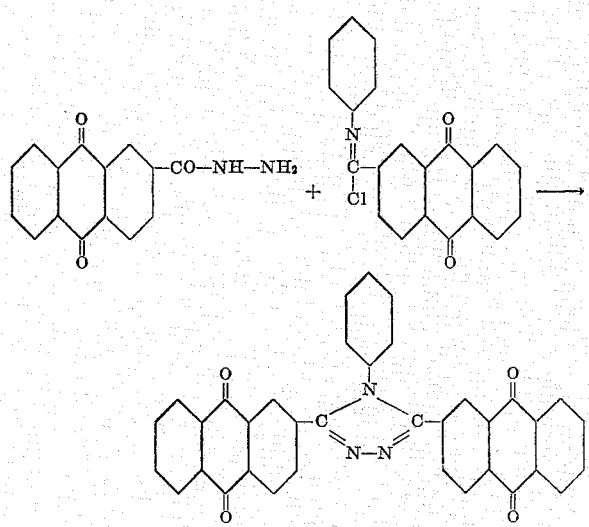

In other cases the dehydration does not occur spontaneously and the amidrazone may be isolated. The amidrazone may be converted to the triazole by a dehydrating agent such as thionyl chloride, sulfuric acid or chlorosulfonic acid.

The resultant triazoles are useful intermediates for the preparation of vat dyes. For instance, 3(1-chloro-2-anthraquinonyl)-4,5-diphenyl-1,2,4-triazole can be tosylamidated by p-toluenesulfonamide and a copper catalyst, and then hydrolyzed to give the corresponding 1-amino compound which is a red vat dye.

My invention can be illustrated by the following examples in which parts are by weight unless otherwise indicated.

Example 1

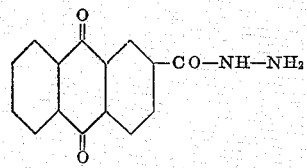

A mixture of 6 parts of ethyl 2-anthraquinonecarboxylate, 125 parts by volume of 85% hydrazine hydrate, and 125 parts of water is refluxed vigorously until the reaction is complete. The addition of 2 or 3 drops of octyl alcohol helps to combat foaming. The solution is then cooled, diluted, and oxidized by bubbling an air stream through it. If desired, dilute hydrogen peroxide may be used as an oxidizing agent, helping to discharge the last traces of color from the suspension. The product is then filtered, washed, and dried.

Ethyl 2-anthraquinonecarboxylate is recovered unchanged, if it is refluxed for 4½ hours in solution with hydrazine hydrate in methyl Cellosolve.

Example 2

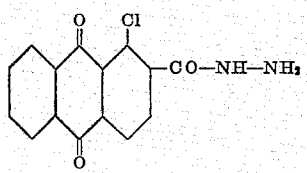

Seven and three-tenths parts of 1-chloro-2-anthraquinonecarbonyl chloride are added to a stirred refluxing solution of 10 parts by volume of 85% hydrazine hydrate in 325 parts by volume of methanol. The reaction is stirred and refluxed until the reaction is complete. The product is filtered, washed with methanol and dried.

Other 1-substituted anthraquinone-2-carbohydrazides are prepared by substituting the equivalent quantities of 1-nitroanthraquinone-2-carboxy chloride, 1-aminoanthraquinone-2-carboxy chloride, 1-amino-4-nitro-2-anthraquinone carboxy chloride, or 5-nitroanthraquinone-2-carboxy chloride for the chloranthraquinone carboxy chloride.

Example 3

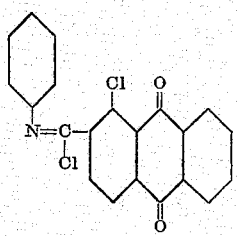

To a refluxing solution of 25 parts by volume of aniline in 400 parts by volume of ethanol is added 12.4 parts of 1-chloro-2-anthraquinonecarbonyl chloride. The mixture is refluxed with occasional stirring until the reaction is complete. It is then cooled and filtered. The product is washed with alcohol and dried.

The 1-chloroanthraquinone-2-carboxanilide prepared above is converted to the desired product as follows: A mixture of 6.00 parts of 1-chloroanthraquinone-2-carboxanilide, 4.2 parts of phosphorus pentachloride, and 45 parts by volume of toluene is refluxed until the reaction is complete. It is then diluted with 45 parts by volume of hexane and chilled. Filtration and washing with petroleum ether gives the 1-chloro-N-phenyl-2-anthraquinonecarboximidyl chloride which may be purified by recrystallization from methylcyclohexane.

Substituted chlorimides are prepared by substituting equivalent amounts of toluidine, phenetidine, anisidine, or 3-aminopyridine for the aniline above, 1-nitroanthraquinone-2-carbonyl chloride, 1-aminoanthraquinone-2-carbonyl chloride or 1-amino-4-nitroanthraquinone-2-carbonyl chloride for the chloroanthraquinone carbonyl chloride.

Example 4

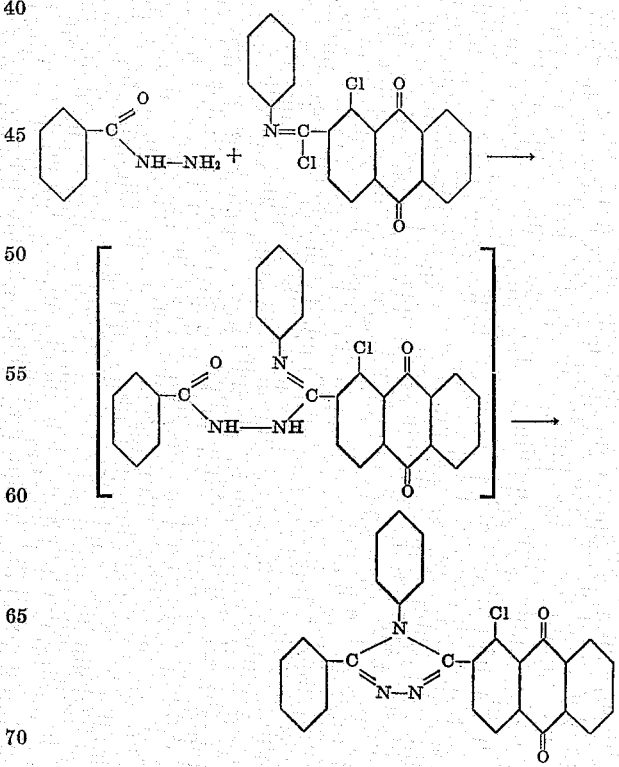

The amidrazone is prepared by adding 0.12 part of benzhydrazide to a solution of 0.32 part of 1-chloro-N-phenyl-2-anthraquinonecarboximidyl chloride in 15 parts by volume of orthodichlorobenzene warmed to about 140° C. The resulting mixture is then refluxed until triazole formation is complete. It is then cooled, diluted with hexane and filtered. The product may be crystallized from dilute acetic acid or pentasol.

Example 5

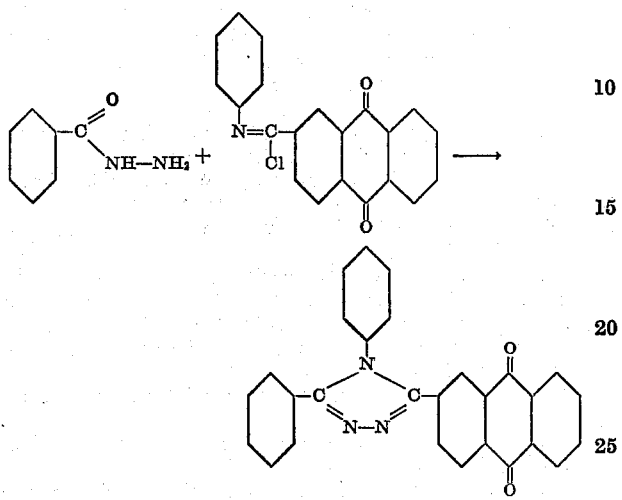

A mixture of 2 parts of anthraquinone-2-carboxanilide and 25 parts by volume of thionyl chloride is refluxed until formation of the chloroimide is complete. The thionyl chloride is then removed by evaporation and final traces removed by adding 15 parts by volume of ortho-dichlorobenzene and distilling off several parts by volume until the B.P. reaches 180° C.

Benzhydrazide, 1 part, is then added to the mixture which is stirred until the reaction is complete. The product is then chilled, diluted with a little benzene, filtered and washed.

The use of equivalent amounts of other hydrazides such as 2-methoxybenzhydrazide, toluoylhydrazide, 4-benzoylamino benzhydrazide, 2,4-dimethoxy benzhydrazide, nicotinoyl hydrazide, thenoyl hydrazide or 2-naphthoyl hydrazide, in place of benzhydrazide leads similarly to the corresponding 5-substituted-4-phenyl-3-anthraquinonyl-1,2,4-triazole.

Example 6

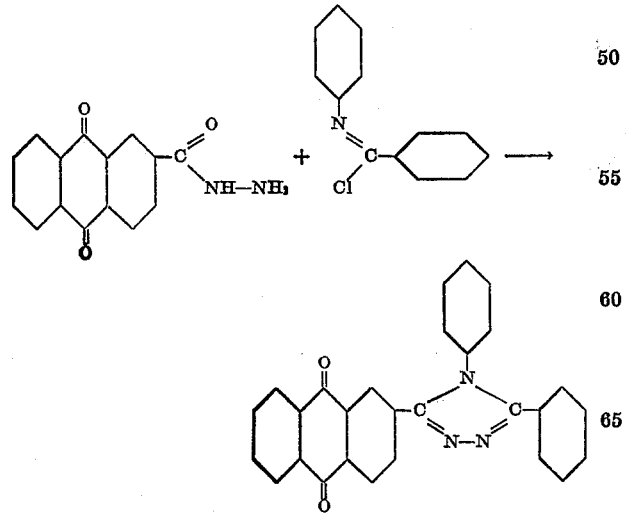

N-phenylbenzimidyl chloride is prepared from 0.3 part of benzanilide by refluxing with 1 part of thionyl chloride, excess thionyl chloride being removed by heating. After the addition of 3 parts by volume of ortho-dichlorobenzene and 0.3 part of 2-anthraquinonecarbohydrazide, the mixture is stirred at 180° C., until the reaction is complete. It is then cooled and the triazole collected and dried.

This triazole product gives a brown-red vat from which it is recovered unchanged on aeration. It is identical with the triazole obtained in Example 5.

Example 7

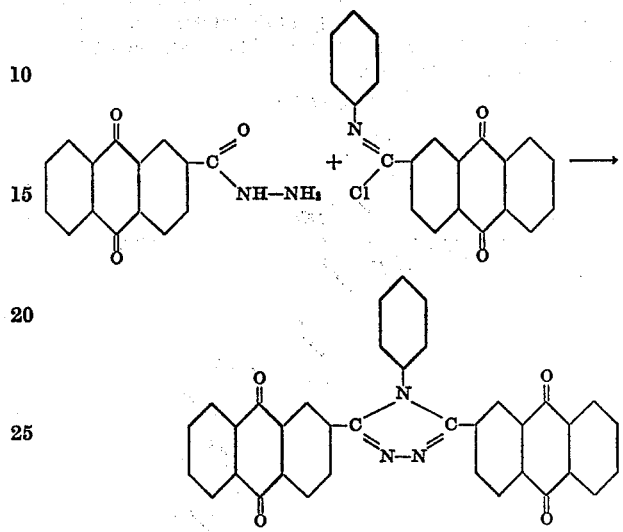

A mixture of 0.5 part of 2-anthraquinonecarboxanilide, 8 parts by volume of thionyl chloride and 1–2 drops of pyridine is heated at reflux until formation of the chloroimide is complete. The remaining traces of thionyl chloride are removed by adding 30 parts by volume of ortho-dichlorobenzene and distilling out 10 parts by volume of liquid. 2-anthraquinonecarbohydrazide, 0.1 part, is then added and the mixture stirred at 200–210° C., until formation of the triazole is complete. The product is isolated by cooling and filtration. It may be purified by crystallization from Carbitol or ortho-dichlorobenzene.

Example 8

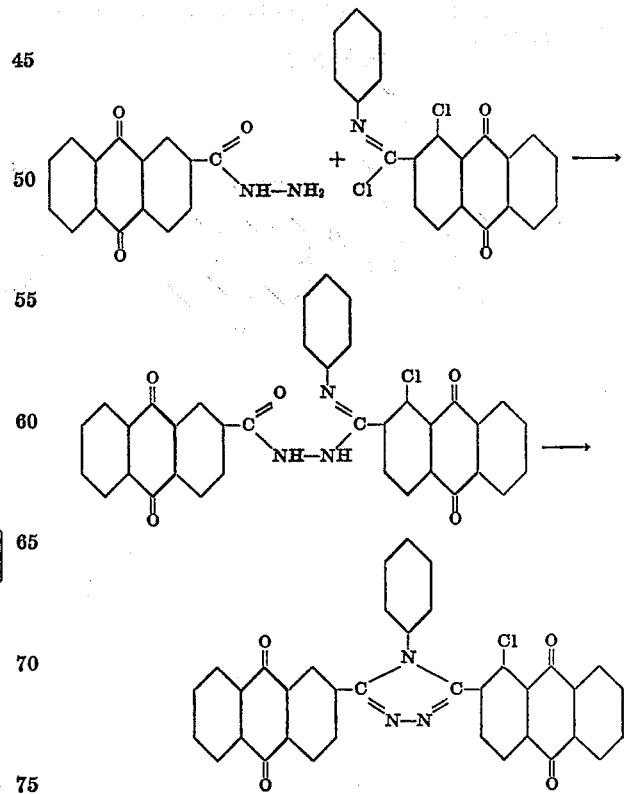

A mixture of 1.53 parts of 2-anthraquinonecarbohydrazide and 2.20 parts of 1-chloro-N-phenyl-2-anthraquinonecarboximidyl chloride in 40 parts by volume of o-dichlorobenzene, is stirred for four and one-half hours at 155–160° C., and then is refluxed until the reaction is complete. The amidrazone product is isolated by cooling and filtration. It may be purified by crystallization from chlorobenzene or glycol diacetate. By heating with thionyl chloride or sulfuric acid, it is converted to the corresponding triazole.

*Example 9*

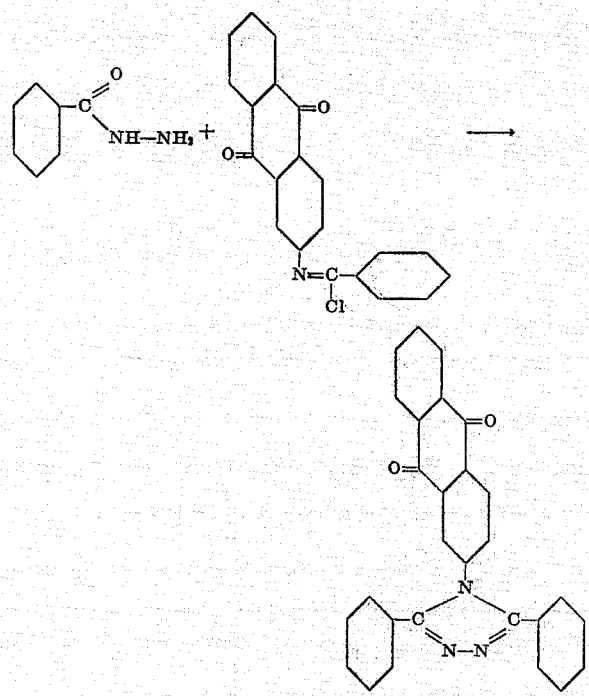

The procedure of Example 5 is followed using 2-benzoylaminoanthraquinone in place of anthraquinone-2-carboxanilide. The product is the isomer of the product of Example 5.

*Example 10*

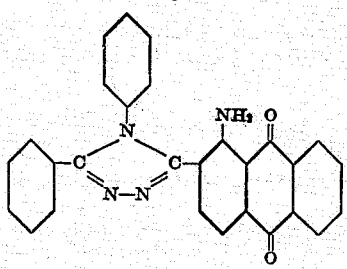

A mixture of 4.5 parts of the product of Example 4, 3.7 parts of p-toluenesulfonamide, 0.8 part of anhydrous sodium acetate, 2.0 parts of cuprous chloride, and 55 parts of o-dichlorobenzene is stirred at reflux until the reaction is complete. The mixture is cooled, and filtered. The product is washed with alcohol and water and dried. The p-toluene sulfonyl group is removed by heating to 100° C. in 150 parts of 96% sulfuric acid, followed by dilution with water and filtration. The product is a red solid, dying cotton a red shade.

I claim:

1. The process of preparing a condensation product of the anthraquinone series which comprises heating an aryl carbohydrazide with an aroylarylide chlorimide above 120° C. in an inert aromatic solvent, at least one of said carbohydrazide and said chlorimide being an anthraquinonyl derivative.

2. In the process of preparing 3,4,5-triaryl-1,2,4-triazoles in which at least one of the 3,4 and 5-aryl groups is 2-anthraquinonyl, the process step which comprises heating together above 120° C. in an inert aromatic solvent an aroyl hydrazide and an aroylarylide chlorimide, at least one of the aryl groups in said reactants being 2-anthraquinonyl.

3. The process of claim 2 in which the aroyl hydrazide is an anthraquinonyl carbohydrazide.

4. The process of claim 2 in which the chlorimide is a 2-anthraquinone carboximidyl chloride.

5. The process of claim 2 in which both the chlorimide and the aroyl hydrazide are 2-anthraquinonyl derivatives.

6. The process of claim 3 in which the aroyl hydrazide is anthraquinone-2-carbohydrazide.

7. The process of claim 3 in which the aroyl hydrazide is 1-chloranthraquinone-2-carbohydrazide.

8. The process of claim 7 in which the chlorimide is N-phenylbenzimidyl chloride.

9. The process of claim 7 in which the chlorimide is N-phenyl-2-anthraquinonecarboximidyl chloride.

References Cited in the file of this patent

UNITED STATES PATENTS 2,352,944    D'Alelio _____ July 4, 1944

OTHER REFERENCES

Shavel et al.: J. Amer. Pharm. Assoc., vol. 42 (1953), pp. 404–5.